UNITED STATES PATENT OFFICE.

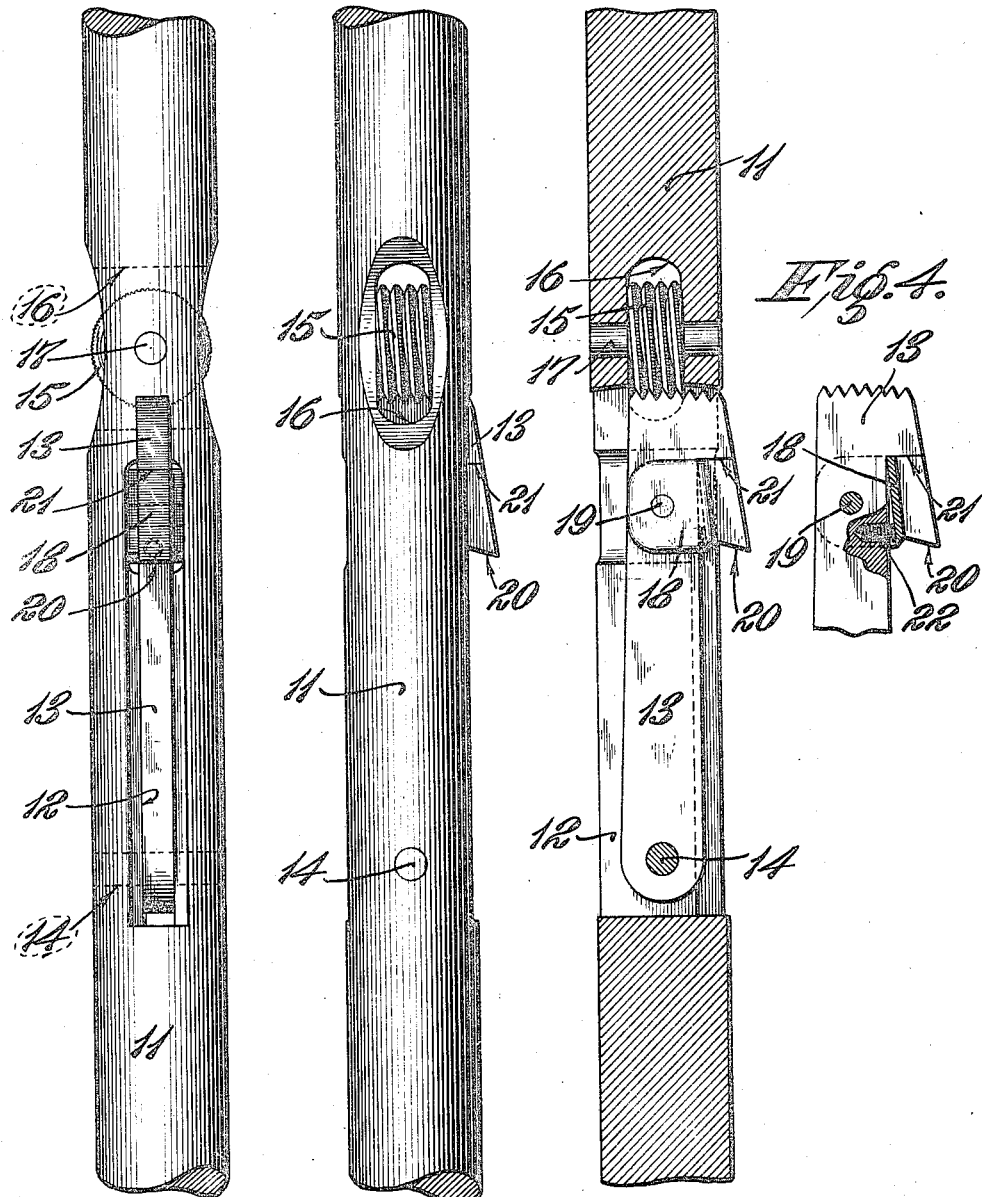

WILLIAM F. SCHMIDT, OF ST. LOUIS, MISSOURI.

KEYWAY-SLOTTING DEVICE.

1,210,544.　　　　　Specification of Letters Patent.　　Patented Jan. 2, 1917.

Application filed November 11, 1915.　Serial No. 60,956.

*To all whom it may concern:*

Be it known that I, WILLIAM F. SCHMIDT, a citizen of the United States, and a resident of the city of St. Louis and State of Missouri, have invented a new and useful Improvement in Keyway-Slotting Devices, of which the following is a specification.

This invention relates to slotting keyways in the hubs of pulleys, gears, and the like, and consists in a slotting cutter carried by a bar which is adapted to be held in a drill press, arbor press, lathe, slotting machine, or other machine having a longitudinally movable spindle in or on which one end of the bar can be mounted.

The object of the invention is to provide for slotting keyways in types of machine tools which are part of the usual equipment of power plants, manufacturing establishments and small machine shops.

The invention also consists in the parts and arrangement of the slotting bar and cutter shown in the accompanying drawings, and is more particularly defined in the appended claims.

In the drawings, wherein like reference characters designate the same parts in the several views, Figure 1 is a face view of a cutter bar and cutter embodying the invention; Fig. 2 is a side view of the same; Fig. 3 is a longitudinal section of the same on the principal axis of the cutter bar, showing the cutter support, cutter, and adjusting screw in side elevation; and Fig. 4 is a side view of a portion of the cutter support and cutter, parts being broken away to disclose the detail construction.

The ends of the supporting bar 11 are not shown in the drawings, but they may be suitably formed for holding the bar in a chuck or socket of the tool spindle of a drill press, broaching or slotting machine, or center spindle of an arbor press or tail stock of a lathe, or in the tool post or other clamping device on the lathe carriage, the essential thing being that the bar shall be mounted for movement lengthwise with respect to the work. The middle of the bar is arranged in axial alinement through the hub of the gear or pulley to be slotted, and the free end of the bar may be guided in a bushing or other suitable device secured to the frame or to the work table of the machine.

The bar 11 has a long narrow slot or groove formed in it lengthwise at its middle, the side walls 12 of the slot being parallel to each other and spaced at equal distances from the axis of the bar. Fitting in this slot is a flat cutter holder 13, one end of which is pivoted to the bar by a transverse pin 14, permitting movement of the other end of the cutter toward and away from the axis of the bar. The movable end of the cutter holder is curved to conform to an arc of a circle having the pin 14 for a center, and is provided with transverse notches or teeth which engage with a knurled adjusting screw 15 arranged crosswise of the bar in a slot 16. The slot 16 extends through the bar at right angles to the end of the slot 12. The screw is mounted for rotation on a pin 17 which extends through the bar across the middle of the slot 16. The sides of the bar near the ends of the slot 16 are recessed to permit the screw 15 to be rotated by the thumb and finger.

The cutter 18 is pivotally arranged on the outer edge of the cutter support 13, and is held in place by a pivot 19 which is located near the movable end of the cutter support. The cutting face 20 of the cutter projects from the slot 12 on one side of the bar, the slot being enlarged or widened near its end to receive the cutter. The outer edge of the cutter is sloped back from its point, and its back edge abuts squarely against a shoulder 21 on the outer edge of the cutter support at its movable end. The cutter is bifurcated along its inner edge to straddle the edge of the cutter support, and the pivot pin 19 passes through the cutter support and its ends engage the two branches of the cutter, being held in place by the side walls of the widened portion of the slot 12. A spiral compression spring 22 is arranged between the inner side of the cutter and the edge of the cutter bar to maintain the cutter normally with its cutting edge as far away from the cutter bar as the shoulder 21 will permit. In the operation of the device, the spring 22 permits the cutting edge of the cutter to swing inwardly away from the work sufficiently to relieve it during the return stroke.

To use the device for cutting a keyway in a hub the work is clamped on the work table of the machine if it is a vertical machine (like a drill press), or in a chuck if it is a horizontal machine (like a lathe), and the bar 11 is mounted in the tool spindle of the machine (or against the center spindle) with its middle passing through the hub. The extremity of the bar may be mounted in a bushing in the work table, or guided in any suitable manner. The bar is caused to reciprocate back and forth by moving the spindle back and forth, thereby reciprocating the cutter back and forth through the hub; and prior to each cutting stroke the cutter is fed outwardly slightly by rotating the knurled screw 15. In this manner true slots can be cut without difficulty in hubs of all sizes which are large enough to take the bar 11.

The construction of the device is such that it can be made of small diameter, and supplied with interchangeable cutters of various widths, whereby a large range of keyways can be cut with a single bar. The parts are simple, and can be easily assembled and taken apart by driving out the several pins. The pivot pin for the cutter may be a fairly loose fit, because it is retained in place by the sides of the slot 12 in the working position of the parts, and it may readily be removed by screwing the adjusting screw off of the end of the cutter support and swinging the latter out of the slot.

It is evident from the foregoing description that modifications may be made in the size and shape of the several parts, and the invention is not restricted to the form shown and described except as defined by the appended claims.

I claim the following as my invention:

1. A slotting device comprising a bar having a longitudinal groove in its side, a cutter support arranged lengthwise in said groove, one end of said cutter support being pivoted to said bar to permit the other end to swing transversely thereof, teeth on the free end of said cutter support, a cross slot in said bar across the end of said groove, a screw mounted for rotation in said cross slot, said screw engaging the teeth of said cutter support, and a cutter on the free end of said support projecting from said longitudinal groove.

2. A slotting device comprising a bar having a longitudinal groove in its side, a cutter support arranged lengthwise in said groove and held against longitudinal movement therein, one end of said cutter support being pivoted to said bar to permit the other end to swing transversely thereof, said cutter support having teeth on its free end and a projecting shoulder on its outer edge adjacent thereto, a cross slot in said bar across the end of said longitudinal groove, a screw mounted for rotation in said cross slot, said screw engaging the teeth of said cutter support, and a cutter pivotally secured on the free end of said support, said cutter bearing against said shoulder and projecting from said longitudinal groove.

3. A slotting device comprising a bar having a longitudinal groove in its side, a cutter support arranged lengthwise in said groove, one end of said cutter support being pivoted to said bar to permit the other end to swing transversely thereof, a cross slot in said bar across the end of said groove, an adjusting screw mounted in said cross slot and engaging said cutter support, a cutter pivotally secured on the free end of said support for limited movement crosswise of said bar and projecting from said longitudinal groove, and a spring between said cutter and said cutter support for holding said cutter outwardly in cutting position.

4. In a slotting device, a bar having a narrow slot, a cutter holder mounted in said slot, a cutter pivotally mounted on said holder for inward and outward movement with respect to said slot, means for adjusting said holder and cutter crosswise of said slot, said holder having a shoulder engaging said cutter for limiting its outward pivotal movement, and a spring between said cutter and holder for holding said cutter out against said shoulder.

Signed at St. Louis, Missouri, this 8th day of November, 1915.

WILLIAM F. SCHMIDT.